United States Patent [19]
Doughty

[11] Patent Number: 5,090,517
[45] Date of Patent: Feb. 25, 1992

[54] BRAKING SYSTEM FOR A GROCERY CART OR THE LIKE

[76] Inventor: Robert E. Doughty, 940 S. 134th, Bonner Springs, Kans. 66012

[21] Appl. No.: 516,720

[22] Filed: Apr. 30, 1990

[51] Int. Cl.⁵ .............................................. B62B 5/04
[52] U.S. Cl. ...................................... 188/19; 188/29; 280/33.994
[58] Field of Search .................. 188/1.12, 18 R, 19, 188/29, 342, 2 D, 2 P, 82.8, 82.84; 280/33.991, 33.994; 16/35 R

[56] References Cited

U.S. PATENT DOCUMENTS

| | | | |
|---|---|---|---|
| 1,171,268 | 2/1916 | Smith | 188/29 |
| 2,591,524 | 4/1952 | Douglas et al. | 188/29 |
| 2,638,183 | 5/1953 | Prowinsky | 188/29 |
| 3,029,905 | 4/1962 | Nowak | 188/29 |
| 4,538,825 | 9/1985 | Delahoussaye et al. | 188/82.84 X |
| 4,840,388 | 6/1989 | Doughty | 188/29 X |

FOREIGN PATENT DOCUMENTS 8403073  8/1984  World Int. Prop. O. ...... 280/33.994

*Primary Examiner*—Matthew C. Graham
*Attorney, Agent, or Firm*—Hovey, Williams, Timmons & Collins

[57] ABSTRACT

An apparatus for automatically braking a user-propelled cart such as a grocery cart, luggage cart or the like is provided. The preferred apparatus includes a braking mechanism (40) shiftable between braked and released positions, which brakes at least one support wheel (22) of the cart (12). A shiftable handle (44) is interconnected to the braking mechanism (40) and causes corresponding shifting of the braking mechanism. The braking mechanism (40) and handle (44) are spring biased toward the braked position for automatic braking of the cart when not in use. The braking mechanism includes a brake shoe (78) designed to engage the wheel (22) more tightly in accordance with the amount of forward force applied to the cart (12). In operation, a user pushes generally forwardly on the handle (44) which shifts the interconnected braking mechanism to a released position. When the user releases the handle (44) the spring automatically biases the brake shoe (78) to the braked position. When forward force is applied to the braked cart (12), as by a heavy load or a steep incline, the brake shoe (78) engages the wheel (22) more tightly.

13 Claims, 2 Drawing Sheets

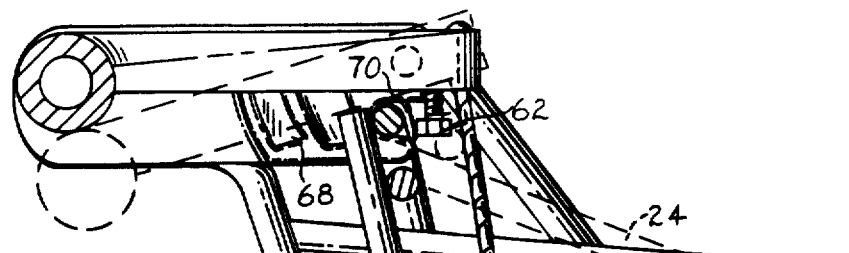
FIG. 2.
FIG. 3.
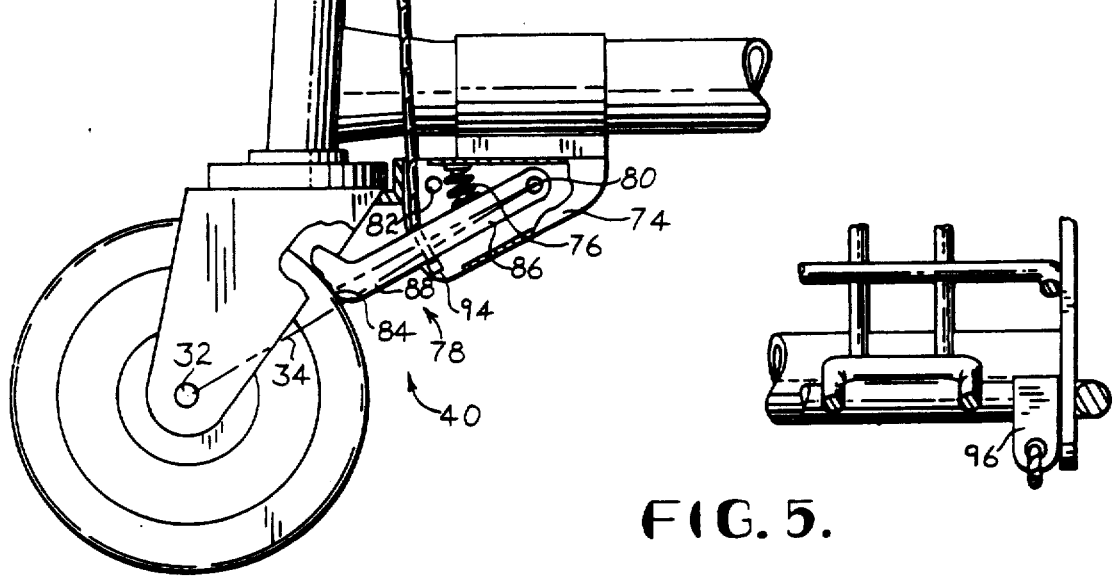
FIG. 5.
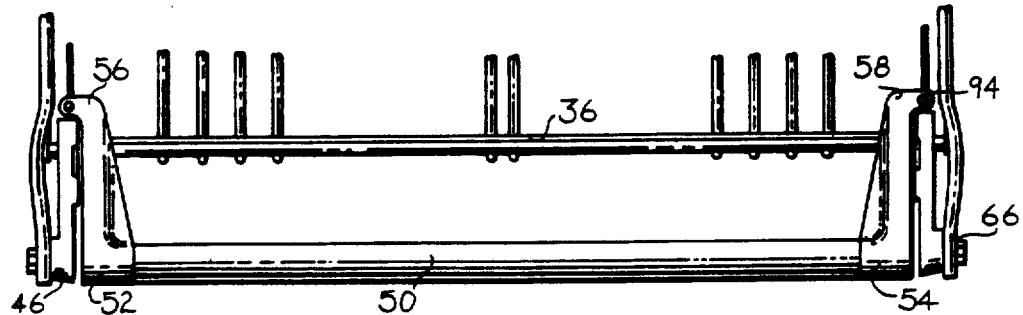
FIG. 4.

5,090,517

BRAKING SYSTEM FOR A GROCERY CART OR THE LIKE

BACKGROUND OF THE INVENTION

1. Field of the Invention

This invention relates to an automatic braking apparatus for use with a user-propelled cart such as a grocery cart, luggage cart or the like which brakes at least one support wheel in accordance with the amount of forward force applied to the cart. More particularly, it is concerned with a braking mechanism interconnected to a shiftable handle which, when pushed generally forwardly by a user, shifts a brake shoe from a braked position to a released position.

2. Description of the Prior Art

Free-wheeling conventional user-propelled carts such as grocery carts, luggage carts and the like may present a hazard by becoming self propelled during loading and unloading and when left unattended. The likelihood and magnitude of the hazard are increased when the cart is heavily loaded or positioned on an incline.

A number of braking mechanisms have been proposed in the past for user-propelled carts. In general, however, these devices have not gained user acceptance and have not been widely adopted because they have been costly, complicated and difficult to install and operate. In addition, previous devices have not addressed the need for increased braking force when the cart is subject to increased forward force.

SUMMARY OF THE INVENTION

The problems outlined above are solved by the automatic braking apparatus in accordance with the present invention. That is to say, the apparatus hereof is mechanically simple and thereby reliable, easily installed in both new and older carts and provides braking of even heavily laden carts when the handle is released. The braking mechanism is easily disengaged when a user pushes generally forwardly on the handle. Modification of a conventional cart by installation of the present invention does not substantially alter the appearance or operation of the cart. No special accommodation is required of the user.

The automatic braking apparatus hereof broadly includes a braking mechanism for coupling with a cart including a brake shoe for braking at least one support wheel of the cart, a shiftable handle, means for connecting the handle to the braking mechanism, and means for biasing the braking mechanism and the handle toward the braked position. The brake shoe is designed to engage the wheel more tightly in accordance with the amount of forward force on the cart. A user pushing the cart generally forwardly shifts the handle and thereby the braking mechanism to a released position. When the handle is released, a biasing means urges the brake shoe to a braked position which additionally serves to brake the rearward motion of the cart.

In particularly preferred forms, a braking mechanism is included for braking each of two rear support wheels, with the corresponding connecting means including cables, and with the biasing means including springs. Advantageously, the brake shoes are L-shaped and positioned to contact the wheels so that they engage the wheel more tightly in accordance with the amount of forward force applied to the cart.

BRIEF DESCRIPTION OF THE DRAWINGS

FIG. 2 is a fragmentary vertical section of the handle of the apparatus showing the connecting means connected thereto coupled with the cart shown in partial vertical section;

FIG. 3 is a fragmentary side elevational view of the braking mechanism with portions broken away for clarity and of the connecting means shown coupled adjacent one wheel of the cart;

FIG. 4 is a partial plan view of the handle of the apparatus of FIG. 1 coupled with the cart shown in partial plan view;

FIG. 5 is a fragmentary horizontal section taken on line 5—5 of FIG. 1;

DESCRIPTION OF THE PREFERRED EMBODIMENT

Figure 1:
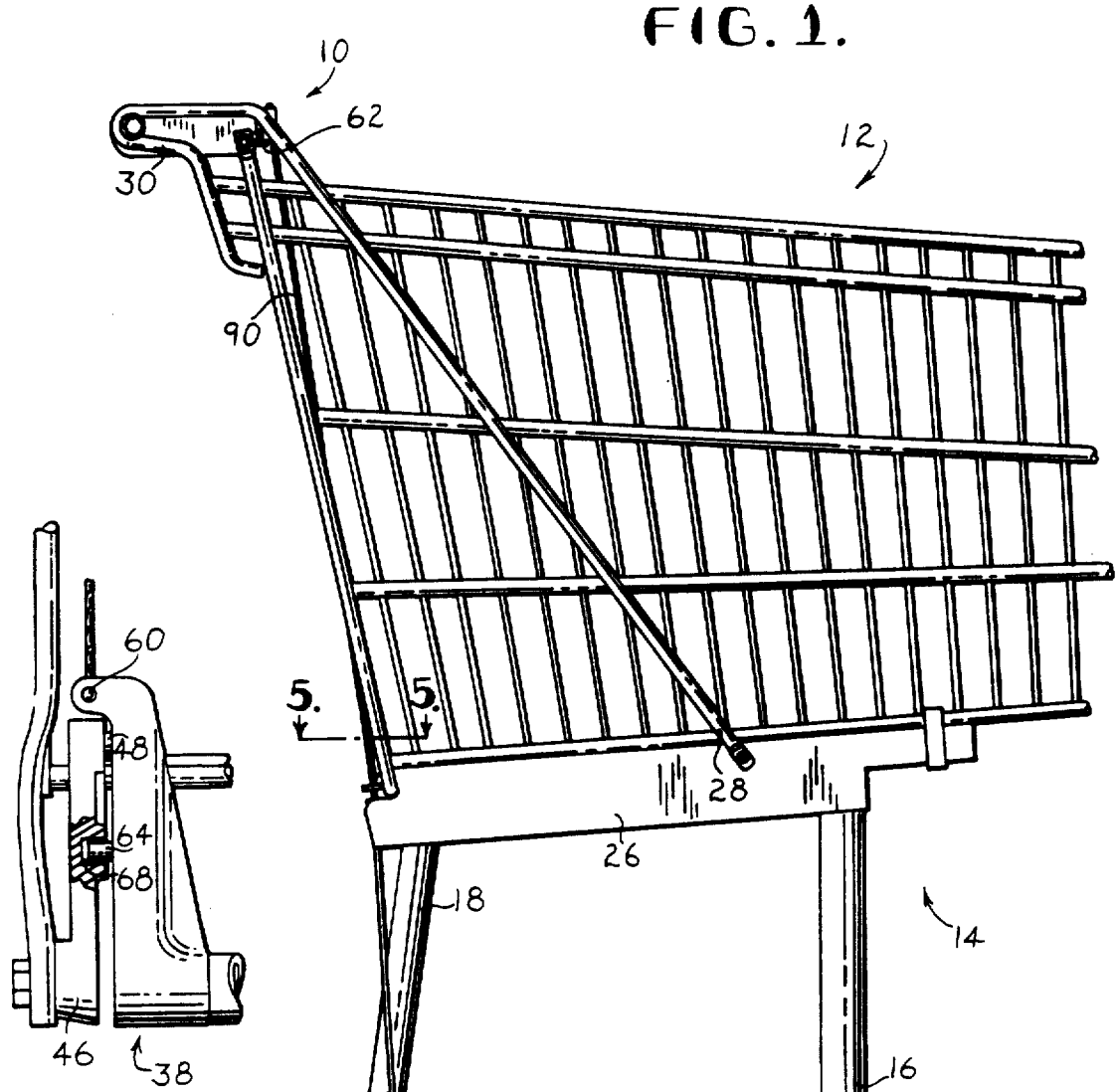
FIG. 1 is a partial side elevational view of the braking apparatus connected to a grocery cart shown in partial elevation.

Referring now to the drawings, an automatic braking apparatus 10 in accordance with the invention is shown in use with a cart 12, herein illustrated as a grocery cart. Those skilled in the art will appreciate that the braking apparatus of the invention may be embodied in connection with any of a number of other forms of user-propelled carts with one or more ground engaging wheels, such as luggage carts. Preferably apparatus 10 and cart 12 include paired left and right structures which are identical in all respects except handedness. Accordingly, unless otherwise specified, a single reference numeral is used to designate both left and right structures of a pair.

Cart 12, illustrated in FIG. 1, includes a body 14, left and right front support beams 16 (only the right is shown), left and right rear vertical support beams 18 (only the right is shown), left and right lower support beams 20 (only the right is shown), left and right front and rear wheels 22 (only the right rear is shown), and a nesting panel 24.

Body 14 includes left and right plates 26 (only the right is shown), and left and right diagonal braces 28. Left and right plates 26 are mounted in generally upright position along the lower, rear, outboard portion of cart body 14. Left and right diagonal braces 28 are attached to plates 26 and extend upwardly and rearwardly terminating in left and right handle support portions 30.

Wheels 22 rotate about axes 32. Rear wheel 22 presents a radius 34 which may be extended through axis 32. Rear nesting panel 24 depends from and is supported by cross brace 36.

Braking apparatus 10 includes a rearwardly disposed operating assembly 38, left and right braking mechanisms 40 (only the right is shown), and left and right connecting cables 42.

Figure 6:
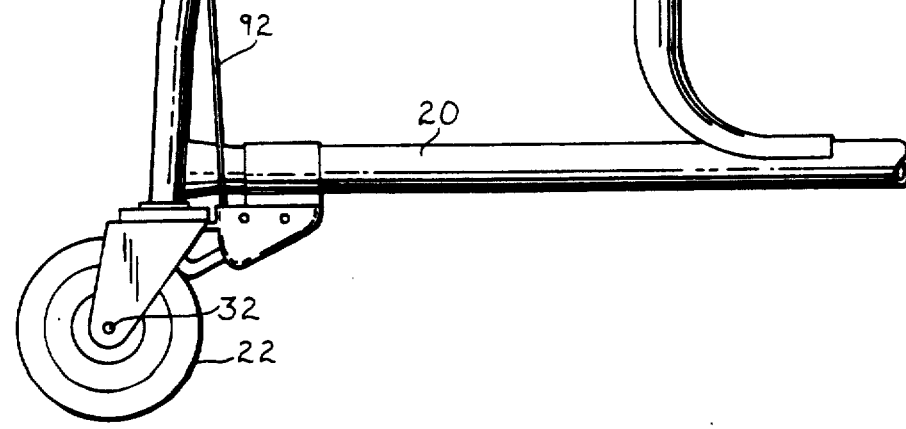
FIG. 6 is a fragmentary top plan view of the handle of the apparatus of FIG. 1 with parts broken away for clarity.

Operating assembly 38, as typically illustrated in FIGS. 2, 4, and 6, includes handle 44, left and right pivot support members 46, and left and right transversely extending pivot pins 48 interconnecting handle 44 and pivot support members 46.

Cast metal handle 44 presents a generally yoke-shaped configuration although those skilled in the art will appreciate that other configurations are possible.

The handle 44 includes a transverse, tubular, metal, graspable portion 50, left and right, Z-shaped, cast metal, pivot arms, 52 and 54 which are coupled with and extend forwardly from opposed ends of graspable portion 50.

Pivot arms 52,54 present left and right, curved, forward, outboard portions 56 and 58 extending transversely beyond the respective forward ends of pivot supports 46 and include left and right cable connection holes 60 defined therein. Arms 52, 54 further include left and right adjustable nesting panel engagement screws 62 threadably received in the lower surfaces of the arms adjacent forward outboard portions 56,58 in order to engage nesting panel 24 when raised and disengage nesting panel as further described hereinbelow. Left and right bosses 64 (only the left is shown) extend transversely from the central outboard surfaces of arms toward pivot supports 46.

Left and right, cast metal, pivot support members 46 are attached in spaced relationship to left and right handle support portions 30 by means of transverse threaded bolt holes 66 at the respective rearward ends. Pivot supports 46 further include left and right, generally upright, boss-receiving slots 68. Bosses 64 fit within slots 68 and thereby limit the shifting of handle 44. The forward facing surfaces of pivot supports 46 form connection slots 72 for receiving transversely extending nesting panel cross brace 38.

Left and right pivot pins 48 interconnect left and right pivot arms 52,54 with left and right pivot supports 46 in order to present a mechanical advantage of between about 5:1 to 8:1. In the preferred embodiment the mechanical advantage is 6.25:1.

Left and right braking mechanisms 40 (only the right is shown), illustrated in FIG. 3, each include a mounting bracket 72, a housing 74, a spring 76, a brake shoe 78, a brake shoe pivot pin 80, a stop 82, and present a point-of-contact 84 where shoe 78 contacts the peripheral surface of cart wheel 22.

Mounting bracket 72 preferably includes a pair of C-shaped clips configured to fit about the rearward portion of lower support beam 20.

Metal housing 74 is preferably coupled to the lower surface of bracket 72 and depends downwardly therefrom. Housing 74 is preferably formed in two pieces and joined to present a compartment, with openings in the top and bottom, for holding spring 76 and brake shoe 78. Housing 74 further includes a forward pivot pin 80 and a rearward stop 82, each extending transversely between the walls.

Coil spring 76 is disposed in compression between the top of housing compartment 74 and the forward top flat surface of brake shoe 78 in order to yieldably bias shoe 78 into contact at point-of-contact 84 with the circumferential surface of wheel 22.

Metal, L-shaped brake shoe 78 preferably includes an elongated arm 86, and a shortened arm 88. Pivot pin 80 extends through elongated arm 86 adjacent the forward end thereof for pivotally mounting shoe to housing 74. Shortened arm 88 presents a grooved, wheel engaging surface to enhance braking efficiency of the shoe and to enable it to dig into the surface of the wheel.

The wheel engaging surface of shortened arm 88 engages the surface of wheel 22 at point of contact 84. Wheel rotational axis 32 and pivot pin 80 define an extended radius 34 therebetween as shown in FIG. 3. Further, axis 34, pivot pin 80, and point-of-contact 84 define a triangle with point-of-contact 84 offset from radius 34 between about 2 and 10 degrees in a direction opposed to the forward rotational direction of wheel 22. In the preferred embodiment, point-of-contact 86 is offset from radius 34 by about 4 degrees.

As shown in FIGS. 3, 4, and 5, left and right cables 42 include upper ends 90, lower ends 92, upper and lower ferrules 94, and eyelet guides 96.

Cables 42 preferably consist of flexible braided wire. However, those skilled in the art will appreciate that rigid metal, wood, synthetic resin, natural or synthetic cord or other alternate materials might be utilized. Cables 42 provide the means for connecting handle 44 with braking mechanism 40.

The upper ends 90 of cables 42 pass through cable connection holes 60 defined in the forward outboard portions of arms 52,54. The lower ends 92 of cables 42 pass through appropriate openings defined in housing compartment 74 and in elongated arm of brake shoe 86. Ends 90,92 are held in place by ferrules 94. Where a flexible, non-rigid cable material is used, synthetic resin eyelet guides 96 are mounted in spaced relationship to the rear outboard cart body 14.

Braking apparatus 10 is illustrated in the figures in braked position. When the cart is unattended or otherwise not in use, braking apparatus 10 is automatically engaged. Biasing springs 76 bias brake shoes 78 downwardly into contact with the forward surfaces of wheels 22 at points-of-contact 84. This downward movement of brake shoes 78 exerts tension on cables 42 causing arms 52,54 to pivot downwardly and graspable portion 50 to rise.

Frictional contact between brake shoes 78 and wheels 22 impedes rearward travel of the cart. Where the rear wheels are below grade, the slowed rotation of rear wheels 22 provides a tendency for the cart to turn around so that it faces forwardly down the slope.

When brake shoe 78 is in the engaged braked position and cart 12 is propelled forwardly, forward movement of wheel 22 tends to force point-of-contact 84 toward radius 34. Because lengthening of radius 34 is precluded by the rigid nature of the triangular relationship defined by axis 32, pivot pin 80, and point-of-contact 84, brake shoe 78 more tightly engages wheel surface 22 until forward rotation is halted. Brake shoe stops 82, which prevent wedging at very small angles, are located on housing 74 such that they are encountered by shoes 78 after complete braking of the wheels.

Braking apparatus 10 is easily released during normal pushing of the cart. When a user grasps handle 44 of cart 12 and pushes generally forwardly with a force of less than about 1.0 pounds, the graspable portion 50 shifts downwardly, less than about 0.875 inches. In the preferred embodiment a forward force of about 0.75 pounds is required and the graspable portion 50 shifts about 0.625 inches.

As those skilled in the art will appreciate, the required forward force falls well within the range of force normally applied by a user to propel such a cart. Similarly, the magnitude of the displacement of the graspable portion is well within the range of user acceptability, so that a cart equipped with the claimed braking apparatus is easily operated.

When the cart is in use, downward shifting of graspable portion 50 causes arms 52,54 to pivot upwardly. The downward motion of graspable portion 50 is limited by the downward travel of boss 64 in slot 68.

The upward shifting of arms 52,54 exerts tension on cables 42, shifting connected brake shoes away from points-of-contact 84 with wheels 22 and into a released, unbraked position. The user may then propel the unbraked cart forwardly as any other conventional cart.

When graspable portion 50 is released, biasing springs 76 shift brake shoes 78 back into contact with the surfaces of wheels 22 at points-of-contact 84 and concurrently shift graspable portion 50 upward by exerting downward force on connecting cables 42 to shift braking mechanism 10 automatically from the released or unbraked position to the braked position.

Storage of carts in a nested position serves to release the automatic braking apparatus 10 in the forward carts. Only the rearmost cart 12 remains automatically braked. A group of nested carts can be propelled forward by a user propelling the rearmost cart forwardly as previously described herein.

Upon nesting, the nose of the following cart 12 pushes the rear nesting panel 24 of the preceding cart 12 and causes it to swing upwardly into contact with nesting panel engagement screws 62. This action causes the forward portion of connected arms 52,54 to pivot upwardly, exerting tension on cables 42, thereby shifting brake shoes 78 into the released, unbraked position.

The present invention is suited not only for original manufacture, but is equally adapted for easy retrofit of existing carts. Braking apparatus 10 can be provided as a kit with two basic components. The first component preferably includes handle 44 connected to cables 42 and two pivot supports 46. The second component preferably includes brake shoes 78 pivotally connected to respective left and right housings 74, mounting brackets 72 and ferrules 94.

The overall dimensions of handle 44, when pivotally connected to pivot supports 46, conform to those of the transverse handle of an existing cart of conventional design. Installation of apparatus 10 may be accomplished by unskilled personnel without the use of any special tools.

For retrofit, the transverse conventional cart handle is removed. Pivot supports 46 are then attached to the forward outboard surfaces of arms 52,54 by means of pivot pins 48, and bosses 64 are aligned in slots 68. The forked forward surfaces of arms are slipped over nesting panel cross brace 36 and the rear portions of pivot supports 46 are bolt ed into left and right handle support portions 30 of cart diagonal braces 28.

Cables 42 are next fished downwardly through eyelet guides 96 and through openings formed in housing 74 and brake shoes 78. Cables 42 are pulled taught so that the forward portions of arms 52,54 are displaced downwardly and graspable portion 50 is raised. Finally, ferrules 94 are attached to the lower ends of cables 42 to hold them in place.

Having thus described the invention, the following is claimed as new and desired to be secured by Letters Patent:

1. A braking mechanism for a cart having a plurality of rotatable support wheels rotatable in a forward direction, said mechanism comprising:
   a brake shoe presenting a braking surface for engaging the periphery of a cart wheel, the wheel presenting a rotational axis and having a radius presenting a radial dimension;
   coupling means for pivotally coupling said brake shoe with the cart adjacent one of said wheels for pivotal shifting of said shoe about a pivot axis between a braked position in which said braking surface engages the wheel periphery at a point of contact therewith and a released position, and including structure for fixing the distance between said rotational and pivot axes such being along an extended radius of the wheel, said brake shoe having a longitudinal dimension between said pivot axis and said point of contact, the sum of said radial and longitudinal dimensions being greater than said distance between said axes; and biasing means for applying a biasing force to said brake shoe for biasing said shoe toward said braked position, said coupling means further including means for positioning said point of contact offset from said extended radius in a direction opposed to the forward rotational direction of the wheel, said axes and point of contact defining a triangular relationship and cooperatively presenting means for substantially maintaining said triangular relationship, causing said brake shoe to engage said wheel periphery more tightly than said biasing force alone when in said braked position and when force is applied to propel the cart forwardly, and for applying braking action between said braking surface and wheel periphery in accordance with said biasing force when force is applied to propel the cart rearwardly.

2. The apparatus as set forth in claim 1, wherein said brake shoe includes an L-shaped member.

3. The apparatus as set forth in claim 2, wherein said L-shaped member includes a pair of ends, one end having a pivot pin and the opposed end presenting said wheel engaging braking surface.

4. The apparatus as set forth in claim 1, said braking surface further including serrations for grippingly engaging said cart wheel periphery.

5. The apparatus as set forth in claim 1, said biasing means including a spring coupled with said brake shoe for biasing said brake shoe toward said braked position.

6. The apparatus as set forth in claim 1, wherein said spring is coupled with said brake shoe at a point intermediate between said pivot axis and said braking surface.

7. An automatically braked cart comprising:
   a cart body;
   a plurality of rotatable cart support wheels coupled with said cart for rotatable support thereof in order to allow rollable movement of said cart; and
   a braking mechanism including—
      a brake shoe presenting a braking surface for engaging the periphery of a cart wheel, the wheel presenting a rotational axis and having a radius presenting a radial dimension,
      coupling means for pivotally coupling said brake shoe with the cart adjacent one of said wheels for pivotal shifting of said shoe about a pivot axis between a braked position in which said braking surface engages the wheel periphery at a point of contact therewith and a released position, and including structure for fixing the distance between said rotational and pivotal axes such being along an extended radius of the wheel, said brake shoe having a longitudinal dimension between said pivotal axis and said point of contact, the sum of said radial and longitudinal dimensions being greater than said distance between said axes, and biasing means for applying a biasing force to said brake shoe for biasing said shoe toward said braked position, said coupling means further including means of positioning said point of contact offset from said extended radius in a direction opposed to the forward rotational direction of the wheel, said axes and point of contact defining a triangular relationship and cooperatively presenting means for substantially maintaining said triangular relationship, causing said brake shoe to engage said wheel periphery more tightly than said biasing force alone when in said braked position and when force is applied to propel the cart forwardly, and for applying braking action between said braking surface and wheel periphery in accordance with said biasing force when force is applied to propel the cart rearwardly.

8. The apparatus as set forth in claim 7, wherein said cart comprises a grocery cart.

9. The apparatus as set forth in claim 7, wherein said cart comprises a luggage cart.

10. The apparatus as set forth in claim 7, said cart having four of said wheels including two wheels disposed forwardly, and two wheels disposed rearwardly.

11. The apparatus of claim 10, including two of said braking mechanisms for braking said two rearwardly disposed wheels.

12. The apparatus as set forth in claim 7, the cart having a nesting panel shiftable between closed and open positions for allowing nesting of a plurality of carts, said cart further including:
 a shiftable handle coupled with the cart for grasping by a user said handle including—
  a pivot member, and
  means pivotally coupling said pivot member with the cart for pivotal shifting between said braked and released positions; and
 means interconnecting said pivotal member with said braking mechanism for corresponding shifting of said handle and said braking mechanism from said braked to said released position when a suer pushes generally forwardly on said handle, said means interconnecting said handle with said braking mechanism including means for positioning said pivot member for engagement by, and shifting to said released position by the nesting panel when the panel shifts to the open position.

13. The apparatus as set forth in claim 9, wherein said means for positioning said point of contact further includes:
 a housing member; and
 means mounting said housing member to said cart.

* * * * *